United States Patent [19]

Walker

[11] 4,000,727
[45] Jan. 4, 1977

[54] VEHICLE RETROFIT GASOLINE EVAPORATION CONTROL DEVICE

[76] Inventor: Brooks Walker, 1280 Columbus Ave., San Francisco, Calif. 94133

[22] Filed: Sept. 14, 1973

[21] Appl. No.: 397,174

[52] U.S. Cl. ............................ 123/136; 220/85 VR
[51] Int. Cl.² ................. F02M 21/02; B65D 25/14
[58] Field of Search ............... 123/136; 220/85 VR, 220/85 VS

[56] References Cited

UNITED STATES PATENTS

| | | | |
|---|---|---|---|
| 3,001,519 | 9/1961 | Dietrich et al. | 123/136 |
| 3,172,348 | 3/1965 | Berg | 123/136 X |
| 3,518,977 | 7/1970 | Smith | 123/136 |
| 3,610,220 | 10/1971 | Yamada | 123/136 |
| 3,617,034 | 11/1971 | Skinner | 123/136 X |
| 3,648,886 | 3/1972 | Pringle | 220/85 B |
| 3,672,180 | 6/1972 | Davis | 123/136 X |
| 3,673,997 | 7/1972 | Sawada | 123/136 |
| 3,675,634 | 7/1972 | Tatsutomi et al. | 123/136 |
| 3,679,092 | 7/1972 | Sullivan | 123/136 X |
| 3,695,376 | 10/1972 | Fiedler et al. | 123/136 X |
| 3,696,799 | 10/1972 | Gauck | 123/136 |
| 3,709,202 | 1/1973 | Brown | 123/136 X |
| 3,752,135 | 8/1973 | Peterson et al. | 123/136 |
| 3,838,795 | 10/1974 | Berg | 220/85 B |
| 3,874,471 | 4/1975 | Kloefkorn | 180/54 R |

Primary Examiner—Charles J. Myhre
Assistant Examiner—Tony M. Argenbright
Attorney, Agent, or Firm—Owen, Wickersham & Erickson

[57] ABSTRACT

A device for controlling fuel evaporation and overflow expansion out of an automobile fuel tank is connected to the filler neck.

The device is basically designed for easy installation on cars not originally equipped with fuel tank controls (generally referred to as a retrofit evaporation kit). It incorporates a container for receiving both fuel vapors and the liquid fuel overflow and is connected to a carbon cannister vapor storage element. The container has one conduit extending between the container and the filler neck which permits both fuel vapors and liquid fuel overflow to flow back and forth between the container and the filler neck. The container has a second conduit which is connected to the carbon cannister vapor storage element and which permits only fuel vapor to flow from the container to the carbon cannister vapor storage element. A third connection may be used from the carburetor to a diaphragm operated valve in the cannister to control recycle.

13 Claims, 8 Drawing Figures

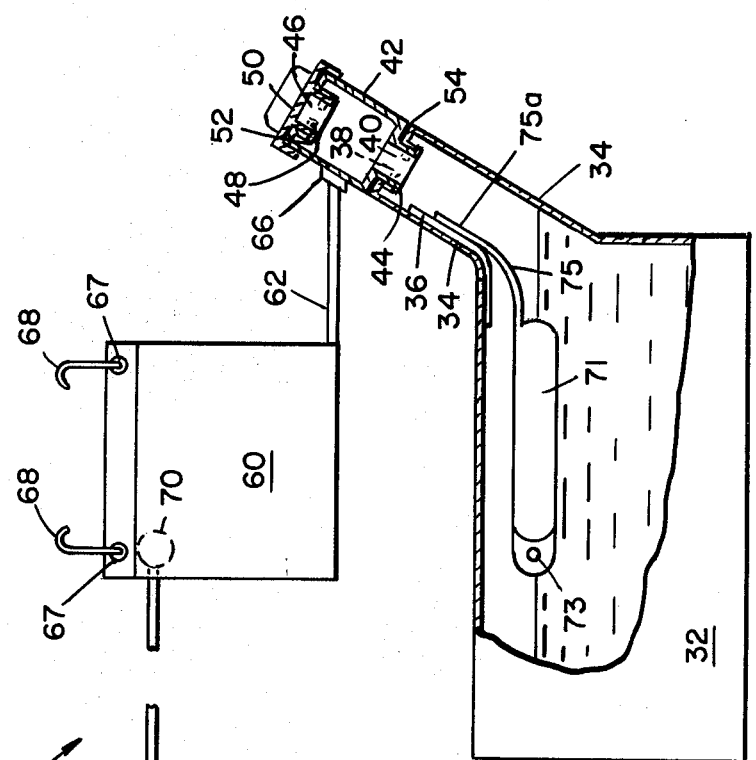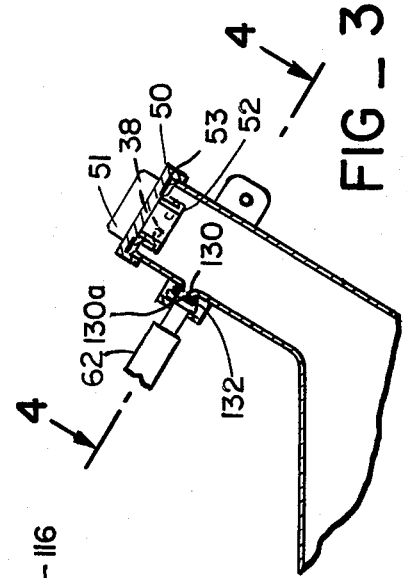

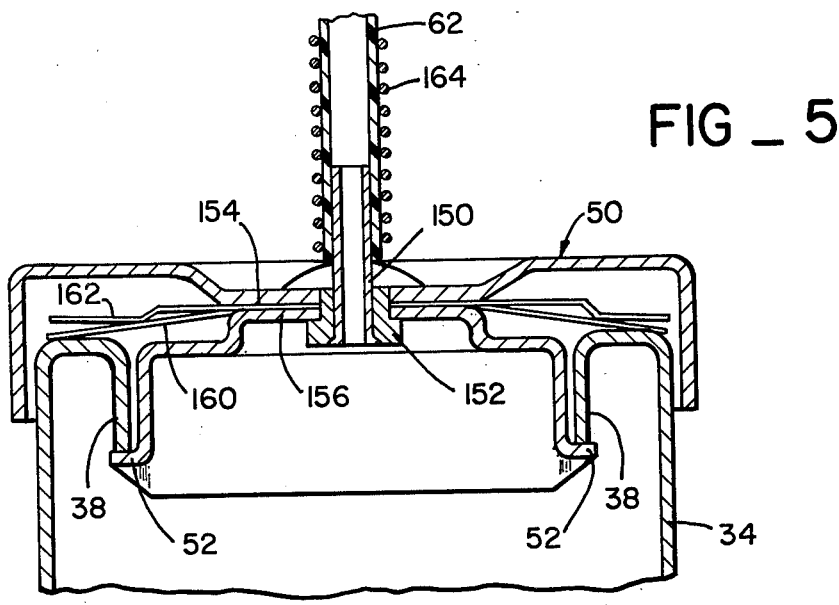
FIG_5
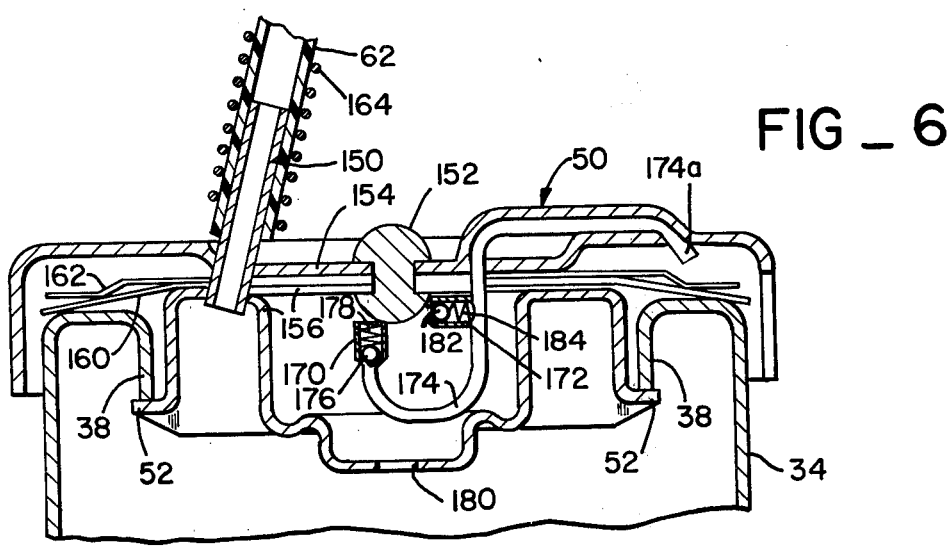
FIG_6
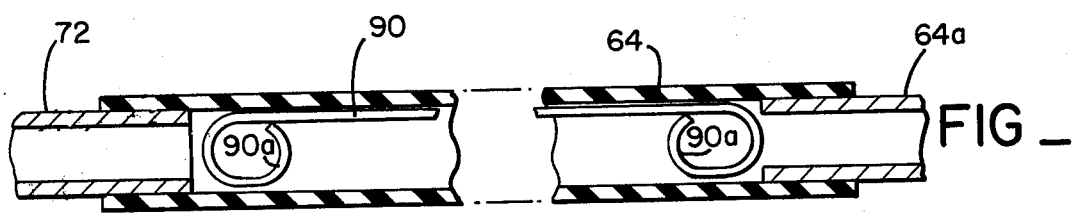
FIG_7
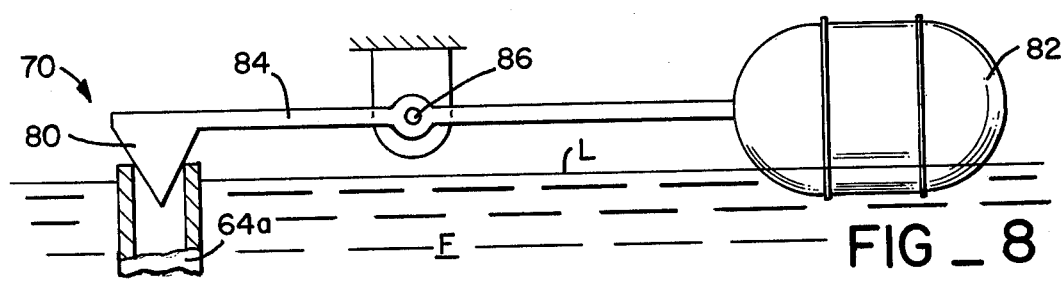
FIG_8

VEHICLE RETROFIT GASOLINE EVAPORATION CONTROL DEVICE

BACKGROUND OF THE INVENTION

This invention relates to a device for controlling fuel evaporation and overflow expansion out of an automobile fuel tank filler neck. It relates particularly to a retrofit kit to be applied to vehicles that do not have evaporation controls.

SUMMARY OF THE INVENTION

The fuel evaporation and overflow expansion control device of the present invention is a kit which can be applied to vehicles, particularly as a retrofit kit for vehicles that do not have evapoation controls.

The kit includes, in all forms, a container or flexible drop out bag which can be mounted in the luggage compartment or other suitable space.

A vent line from the fuel tank filler neck is connected to a lower part of the bag, and a second line runs from the top of the bag to a carbon cannister which stores fuel vapors.

The first vent line can be connected directly to the filler neck (by forming a flared opening in a sidewall of the filler neck). Alternatively, it can be connected by an adapter which fits on the top of the filler neck. As a third alternate it can be connected to the cap for the filler neck.

In all cases the vent line between the container and the filler neck permits both fuel vapors and liquid fuel to flow from the filler neck to the container. Such flow of vapors and liquid fuel occurs during breathing of a full tank on increase in temperatures. Liquid fuel flow may also occur when the gas tank is overfilled or when the car has a full tank of gas and is driven at some inclination which permits the fuel to flow out of the filler neck.

The vent line is connected to a lower part of the bag so that the liquid fuel can gravity flow back to the filler neck from the bag.

The bag or container also has a valve which is normally open but which closes when the bag or container becomes filled with fuel. This prevents liquid fuel from flowing out of the bag and through the second conduit to the carbon cannister and insures that only fuel vapors flow through this second conduit.

Other objects, advantages and features of my invention will become apparent from the following detailed description of one preferred embodiment taken with the accompanying drawings.

BRIEF DESCRIPTION OF THE DRAWINGS

In the drawings:

FIG. 1 is a side elevation view showing a device for controlling fuel evaporation and flow expansion out of an automobile fuel tank filler-neck and constructed in accordance with one embodiment of the present invention;

FIG. 2 is a fragmentary side elevation view showing a tool constructed in accordance with an embodiment of the present invention and used for punching an opening in a sidewall of the fuel tank filler neck;

FIG. 3 is a fragmentary side elevaiton view in cross-section showing the fitting and clamp for attaching a conduit to the opening in the fuel tank filler neck formed by the tool shown in FIG. 2;

FIG. 4 is a plan view taken along the line and in the direction indicated by the arrows 4—4 in FIG. 3;

FIG. 5 is an elevation view in cross-section showing one embodiment of a vented cap constructed in accordance with the present invention and connected to the fuel tank filler neck;

FIG. 6 is an elevation view in cross-section showing another embodiment of a cap constructed in accordance with the present invention and connected to the fuel tank filler neck;

FIG. 7 is an elevation view in section through conduit lines used in the FIG. 1 device and illustrates how a wire member is positioned within relatively thin wall flexible tubing to prevent bending or kinking of the tubing which could block flow through the tubing; and FIG. 8 is an elevation view showing details of a float shut-off valve for the overflow container of the device shown in FIG. 1.

DESCRIPTION OF THE PREFERRED EMBODIMENTS

A device for controlling fuel evaporation and overflow expansion out of an automobile fuel tank filler neck and constructed in accordance with one embodiment of the present invention is indicated generally by the reference numeral 10 in FIG. 1.

In all figures like numerals refer to corresponding parts.

In FIG. 1 I have shown a vehicle engine 12 with an intake manifold 14, a carburetor 16, an air cleaner 18, and a crankcase ventilating line 20 connected to a PCV valve 22. The line 20 and continuation 20a has a tee 24 inserted in the line after the line has been cut to insert the tee 24.

A line 26 is a purge line from a fitting 28 of a carbon cannister 30 and is connected to the tee 24 as illustrated.

The automobile fuel tank 32 has a filler neck 34, and the filler-neck may or may not have a vent tube 36 to aid in filling as shown in FIG. 1.

The upper end of the filler neck has downturned inner flanges 38 and gaps or slots 40 in these flanges which normally permit the hooks or prongs 52 of the gas cap 50 to be inserted through the slots and then turned down into the filler neck underneath the flanges.

In accordance with one embodiment of the present invention an adapter 42 is positioned on the upper end of the filler neck.

The lower end of the adapter 42 is formed with hooks 44 which pass through the slots 40 and engage the underside of the flanges 38 to pull the adapter down in vapor tight sealing engagement with the filler neck by turning the adapter 42 in the same way that the cap would normally be turned onto the filler neck. A gasket or seal 54 may preferably be placed between the adapter and filler neck as illustrated to insure a vapor tight seal.

The top part of the adapter 42 has gaps 46 between downturned flanges 48 which are like the gaps 40 and the flanges 38 at the top of the filler neck.

A cap 50 has hooks or prongs 52 which pass down through the slots or gaps 46 and hook under the flanges 48 so that the cap is pulled down into tight vapor sealing engagement with the top of the adapter 42 when the cap 50 is turned onto the top of the adapter 42.

The cap 50 and adapter 42 thus serve as a retrofit assembly to prevent fuel vapors from escaping past the cap 50.

The engagement of the cap is shown diagrammatically in FIG. 1. The details are shown in FIG. 5 and are standard practice in the industry.

As will be described in greater detail below with reference to FIG. 6, the cap 50 may be nonvented or it may be vented with a check valve to allow air to enter the filler neck but not to allow fumes to escapt to the atmosphere, a common construction in some of the newer motor vehicles.

The adapter 42 can be very short so as not to interfere with the clearance available for the filler cap in the space provided in the vehicle. This space is usually at the side of the body or at the rear of the body near the fuel tank. The space often has a cover (not shown in these drawings). The cover can be the rear license plate, but the cover does not form a part of this invention.

In accordance with the present invention a container 60 is connected to the adapter 42 by a first conduit 62 and is also connected to the carbon cannister 30 by a second conduit 64.

One end of the conduit 62 is connected to a fitting 66 which extends through an opening in the sidewall of the adapter 42. The other end of the conduit 62 is connected to the lower part of the container 60. This conduit 62 acts as a vent line for conducting fuel vapors from the filler neck 34 to the container 60. The conduit 62 also transmits any liquid fuel overflow from the filler neck 34 to the container 60 where it is stored temporarily. This liquid fuel overflow can occur during filling of the tank. It also can occur on expansion with high temperatures with a full tank or on tilting of the car with a full tank.

The container 60 is a flexible bag which is hung from grommets 67 by hooks 68. The hooks 68 can be attached to the upper portion of the vehicle luggage compartment. Alternatively the hooks 68 can be made of spring steel and rest on the luggage floor and engage the drip molding of the luggage compartment door opening.

The conduit 64 is connected at one end to a valve 70 within the container 60 and is connected at the other end to a fitting 72 on the carbon cannister 30.

The valve 70 is a float type shut off valve (shown in detail in FIG. 8) and will be described in greater detail below. However, at this point it should be noted that the valve 70 is normally open to permit free flow of vapors from the filler neck 34 through the conduit 62 and container 60 and conduit 64 to the cannister 30. The valve 70 will close only if the liquid level in the container 60 rises near to the top of the container 60 and the connection to the conduit 64.

The carbon cannister 30 is of the kind usually connected to the fuel tank of new vehicles for evaporation control. No details of the cannister are shown here since the cannister is a conventional commercial construction.

The cannister can be attached to the front wheel cover under the hood by self-tapping screws or by other suitable means in the preferred space, usually under the hood of the vehicle.

It should be noted that the line 26 going from the top of the cannister to the tee 24 and from there to the PCV valve 22 can alternatively be connected directly to the air filter housing as by the line 26a shown in phantom outline in FIG. 1.

In operation, as the fuel tank 32 breathes on changes in temperature, as between day and night, the fumes will pass from the tank 32 through the filler neck 34 and into the adapter 42. From there the fumes will pass through the fitting 66 and the conduit 62, through the container 60, out the conduit 64, through the fitting 72 and into the carbon cannister 30 where the fuel vapor will be stored in the carbon.

When the engine 12 is run, the intake of air will draw the air from the underside of the cannister 30 (through an opening conventionally provided) to purge the carbon in the cannister of most of the absorbed fuel vapor by passing it through the line 26 to the tee 24 (or directly to the air filter housing 18). The vapor flows from the tee 24 through the PCV valve 22 and into the intake manifold 14. Air to purge the cannister is usually admitted through a filtered opening at the bottom of the cannister such as 30a.

Crankcase emissions flow from a fitting 19 on the crankcase or valve cover by the line 20 through the tee 24 and into the PCV valve 22 and then to the carburetor 16 or the engine intake manifold 14.

The device shown in FIG. 1 thus includes an adapter 42, a container 60, supporting hooks 68 and a cannister 30 and supporting screws.

With this kit no holes need to be drilled except to mount the cannister 30. If no suitable mounting bolts or screws are available under the hood, punched holes and self-tapping screws can be used. Plastic hoses may be used if the plastic is fuel proof.

As noted above, the container 60 has a valve 70 for preventing overflow of liquid fuel out of the container through the line 64. This valve 70 is shown in considerably enlarged diagrammatic detail in FIG. 8 and comprises a valve element 80 which seats within the upper end 64a of the conduit 64 to block flow of liquid out of the container 60 and through the conduit 64 when the level L of the liquid fuel F in the container 60 gets high enough to cause a float 82 to move a lever 84 about a pivot 86 to push the valve element 80 downward into the hose end or fitting 64a. Normally the weight of the float 82 causes the lever 84 to swing about the pivot 86 to maintain the valve 70 open. Other suitable liquid flow preventing check valve structure can be used.

In some cases it is desirable to place an inflatable bladder 71 within the fuel tank 32. In accordance with the present invention such an inflatable bladder 71 has an end flange and an opening or grommet 73 at one end and an elongated flexible tube 75 at the other end. The bladder, when uninflated, is small enough to pass through the flanged opening in the filler neck 34, and the grommet 73 permits a wire or flexible rod to be connected to this end of the bladder to pull the bladder down into the tank 32. After the bladder 71 has been so pulled into place, the rod is slipped out of the opening 73 and withdrawn. The elongated tube 75 then permits the bladder to be inflated to the desired size, and the end 75a of the tube is then sealed and dropped into the tank 32 as illustrated. After filling the tank with cool fluid, the bladder can compress on expansion of the fluid to limit the flow of fluid into the container 60 in a manner acting somewhat similar to the baffler on new car construction.

The hoses or conduits 62 and 64 are preferably relatively thin wall flexible hoses, and thus are subject to kinking which could block or restrict flow within the conduits.

In accordance with the present invention a flexible wire 90 (see FIG. 7) is placed within each of the conduits 62 and 64, and the wire is stiff enough to prevent bending of the conduits at an angle which could close off internal flow. The ends of the wire 90 are curved upward as illustrated at 90a to prevent these ends from puncturing the sidewalls of the hoses or conduits or entering the metal tube to which the flexible tubes are attached.

In some cars the filler cap is flush with the body and an extension of the filler neck is undesirable. In such cases a tool such as shown in FIG. 2 may be desirable to punch a hole and to draw the hole to center for locating a fitting. The vent attachment of the present invention which is then attached to the opening in the sidewall filler neck has a further advantage of being less expensive than the adapter shown and described above with reference to FIG. 1.

As illustrated in FIG. 2, the tool 100 has a lever arm 102 which fits on the outside of the filler neck 34. The arm 102 has a flared hole or die 104. A pivot pin 106 passes through a central part of the arm 102. A link 108 is connected at one end to the pin 106 and at the other end to a pin 110.

Toggle links 112 and 114 are operated by a hand lever 116. The link 112 is pivoted to a pin 118 (supported in the arm 122) at the left end of the link 112 (as viewed in FIG. 2). The link 112 is pivoted at a pin 120 at the right end of the link 112 (as viewed in FIG. 2).

An arm 122 supports the pivot pin 118 (as noted above) and is connected at its upper end to a pivot pin 124. The lower end of the arm 122 carries a punch 126 which is in line with the flared opening or die 104 in the arm 102.

A link 121 is also pivoted at the pin 124 and is connected to the arm 102 by a pivot pin 123. The lower end of the arm 121 is connected to the pivot pin 110.

This arm or link 121 causes the pin 124 to move in a slight arc about the pin 123 so the toggle links 112 and 114 will cause the punch 126 to punch and to flare the hole or opening 130 (as shown in FIG. 3).

When manual pressure is applied between the handle 116 and the arm 102 to close the toggle links 112 and 114, the forces are concentrated at the punch and die and are applied from both the inside and outside to minimize deformation as the punch 126 punches a hole through the sidewall of the filler neck 34. The links 112 and 114 permit a manually applied toggle action and the resulting opening 130 as shown in FIG. 3 will be flared as shown at 130a.

After the opening 130 is punched and flared, a seal, such as an O-ring 132, is inserted around the flare, and a fitting 134 (best shown in FIG. 4) with a flared end or shoulder 136 is positioned against the flare 130a and O-ring 132. The fitting is then clamped in place by a flexible clamp 138 which is retained in place by a bolt 140 and nut 142. The clamp 138 may also be in the form of a clamp ring with an opening for the flared fitting 136 and may be of the spring ring type with ends extended to be opened by suitable plyers as is common with hose clamps.

The vent tube or conduit 62 is then attached to the fitting 134, and the operation of the FIG. 3 embodiment is the same as described in connection with FIG. 1.

The cap 50 for the FIG. 3 embodiment has the prongs 52 which engage in the downturned flange 38 in the conventional manner when inserted and turned.

The cap 50 may also have a turning handle 51 and a gasket 53, as illustrated in FIG. 3, to provide a more positive seal against vapor loss.

In both forms of the invention described, the dropout bag or container 60 is designed to accumulate fluid forced out of the tank by complete filling of fuel in the tank and then warming up and expansion. The flexible dropout bag does not have to be vented to the luggage compartment and is as safe as the plastic flexible bags used on many racing cars. This flexible dropout bag or container 60 with a single vent from the filler neck takes care of the overflow from the tank breathing and also overflow when the tank is tilted in any direction. The liquid fuel stored in the container or dropout bag 60 gravity flows back to the fuel tank 32 when the car levels.

The vent line 62 may alternatively be attached directly to the cap (as illustrated in FIGS. 5 and 6) rather than being connected to an adapter 42 (FIG. 1) or to a fitting in an opening formed in the filler neck as described above with reference to FIGS. 2-4.

In the FIG. 5 embodiment the cap 50 has a fitting 150 connected through the central part of the cap within a rivet type connection 152. The rivet 152 also connects an upper part 154 of the cap 50 to a lower part 156 having the prongs 52 which engage the downturned flanges 38 of the filler neck 34. A flexible disk type sealing element 160 and a biasing spring 162 are also clamped between the parts 154 and 156 so that the spring 162 forces the periphery of the sealing element 160 into fluid tight sealing engagement with the upper edge of the filler neck 34 when the cap 50 is turned and locked into place as illustrated in FIG. 5 in a conventional manner.

A flexible coil spring 164 is preferably positioned on the outside of the tube or conduit 62 to add support in the area around the end of the fitting 152 to prevent kinking or breaking of the tube 62 at this location. It also secures the cap to the car to prevent loss after removal to fill.

FIG. 6 illustrates an embodiment of the invention in which the cap 50 is of a construction having a check valve assembly 170 (as noted above) for permitting flow of air into the gas tank while preventing flow of gasoline vapors out of the tank. This figure shows how a vent line 62 from the container 60 is associated with an otherwise conventional cap of this kind.

In the FIG. 6 cap a central rivet 152 attaches an upper part 154 to a lower part 156 of the cap 50. The sealing element 160 and biasing spring 162 act in combination with the forces exerted by the engaged prongs 52 of the cap and downturned flanges 38 of the filler neck to seal off the top of the filler neck 34 as described above.

The fitting 150 for the vent line 62 is positioned off center in the FIG. 6 embodiment since the central part of the cap has a depressed part of the flange 156 to accommodate check valve assemblies 170 and 172. Both check valve assemblies connect to a tube or conduit 174 which has an end 174a open to atmosphere as illustrated.

The check valve assembly 170 includes a ball check valve element 176 which is biased by a coil spring 178 toward sealing engagement with a valve seat as illustrated. If atmospheric pressure exceeds the pressure within the filler neck 34 and tank 32 by a desired amount as determined by the spring force, atmospheric air flowing through the open end 174a and the conduit 174 forces the ball valve element 176 off of its seat to permit atmospheric air to flow into the interior of the tank through an opening 180 in the central part of the flange 156.

The check valve assembly 172 is an excess pressure relief assembly which has a ball valve element 182 normally biased into seating engagement with a valve seat by a coil spring 184. However, if the pressure within the tank should become excessive for any reason, this pressure (flowing through the opening 180) unseats the ball valve element 182 and flows through the conduit 174 and out the open end 174a to prevent damage to the tank or evaporation control device in the case of excessive pressure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A device for controlling fuel evaporation and overflow expansion out of an automobile fuel tank filler neck and comprising,
   an automobile fuel tank having a filler neck,
   an automobile luggage compartment adjacent to and at least partly above said fuel tank,
   container means including a flexible and expandable and substantially completely collapsible bag located in said luggage compartment and positioned with its lower end above said neck for receiving both fuel vapors and liquid fuel overflow from the fuel tank filler neck,
   a vapor storage element,
   first conduit means for connecting the lower end of the flexible bag to the fuel tank through the filler neck to transmit both the fuel vapors and liquid fuel overflow back and forth between the flexible bag and the filler neck,
   second conduit means for connecting the upper end of the flexible bag to the vapor storage element to conduct only fuel vapor from the container means to the vapor storage element, and
   valve means at the upper end of said bag for passing vapor therethrough but preventing passage of liquid therethrough into said second conduit means.
2. The invention defined in claim 1 having an engine and wherein the vapor storage element is a carbon cannister storage element connected to the second conduit means and including third conduit means connecting the storage element to the engine for conducting the stored fuel vapors to the engine during engine operation.
3. The invention defined in claim 1 including hooks for mounting the container means in the luggage compartment of the automobile.
4. The invention defined in claim 1 wherein the valve means comprise a float for closing the valve means when the container means fill with liquid fuel.
5. A device for controlling fuel evaporation and overflow expansion out of an automobile fuel tank through the filler neck and comprising,
   an automobile fuel tank having a filler neck,
   a luggage compartment adjacent to and generally lying above said filler neck,
   a flexible and substantially completely collapsible bag in said luggage compartment with its lower end above said filler neck, for receiving both fuel vapors and liquid fuel overflow from the fuel tank filler neck,
   first conduit means for connecting a lower end of said bag to the filler neck to transmit both the fuel vapors and liquid fuel overflow back and forth between said bag and the fuel tank through the filler neck,
   second conduit means for connecting an upper end of said bag to a vapor storage element by means of a valve at the upper end of said bag preventing passage of liquid so that said second conduit means serves to conduct only fuel vapor from the container means to the vapor storage element,
   cap means for preventing escape of vapors out of the filler neck except through the first conduit means,
   said cap means having a first opening extending through the cap means and connected to the first conduit means, and
   said cap means including a vent line having one end open to atmosphere and a check valve in the vent line for permitting unidirectional flow of atmospheric air through the check valve into the interior of the filler neck.
6. A device for controlling fuel evaporation and overflow expansion out of an automobile fuel tank through the filler neck and comprising,
   an automobile fuel tank having a filler neck,
   a luggage compartment adjacent to and generally above said filler neck,
   a flexible and substantially completely collapsible bag in said luggage compartment with its lower end above said filler neck for receiving both fuel vapors and liquid fuel overflow from the fuel tank filler neck,
   first conduit means for connecting the lower end of said bag to the filler neck to transmit both the fuel vapors and liquid fuel overflow back and forth between the bag and the fuel tank through the filler neck,
   second conduit means for connecting the upper end of said bag to a vapor storage element by means of a valve means for passing vapor and barring the passage of liquid so as to conduct only fuel vapor from said bag to the vapor storage element,
   cap means for preventing escape of vapors out of the filler neck except through the first conduit means and except under pressure in said fuel tank above a predetermined level,
   said cap means having a first opening extending through the cap means and connected to the first conduit means and
   said cap means including a vent line having one end open to atmosphere and
   including an outlet pressure relief valve in the vent line permitting unidirectional flow of vapor from the interior of the filler neck through the vent line to atmosphere when the pressure within the fuel tank exceeds the setting of the outlet pressure relief valve means.
7. The invention defined in claim 6 wherein said cap means includes a vent line having one end open to atmosphere and a check valve in the vent line for enforcing unidirectional flow of atmospheric air into the interior of said filler neck, said check valve and said pressure relief valve being located in a central part of the cap means and wherein the cap means include a fitting extending through the cap means at an off center location for connection to the first conduit means.

8. A device for controlling fuel evaporation and overflow expansion out of an automobile fuel tank filler neck and comprising, an automobile fuel tank having a filler neck, container means for receiving both fuel vapors and liquid fuel overflow from the fuel tank filler neck, first conduit means for connecting the container means to the filler neck to transmit both the fuel vapors and liquid fuel overflow back and forth between the container means and the filler neck, a vapor storage element, second conduit means for connecting the container means to the vapor storage element to conduct only fuel vapor from the container means to the vapor storage element, and an inflatable bladder in the fuel tank which is partially collapsible to fit through the opening in the top of the filler neck.

9. The invention defined in claim 8 including placement means at one end of the inflatable bladder for releasably connecting a rod or wire to the bladder to position the uninflated bladder down into the tank through the top opening in the filler neck and wherein the bladder includes an elongated and sealable stem for inflating the bladder after the bladder has been positioned within the tank.

10. The invention defined in claim 8 wherein the bladder includes inlet means for partially inflating the bladder in the tank and for closing the inlet means after the bladder has been partly inflated.

11. A kit for use on an automobile having a fuel tank with a filler neck and a luggage compartment generally above said fuel tank, in converting an automobile fuel tank previously vented to the atmosphere to one in which evaporative losses from the tank are prevented from escape to the atmosphere comprising, tank cap means adapted for sealing engagement with the fuel tank filler neck, container means addapted for receiving both fuel and fuel vapors from said tank, said container means comprising a flexible and substantially completely collapsible bag adapted to be mounted in the luggage compartment so that the lower end of the bag lies above the connection to the filler neck so that the liquid in the flexible container can gravity flow back to the fuel tank without the need for a vent, vapor storage means for receiving and absorbing said fuel vapors, first flexible conduit means connected to the lower end of said bag adapted for connecting the container means to the filler neck to transmit both the fuel vapors and liquid fuel overflow back and forth between the container means and the filler neck, second conduit means connected to the upper end of said bag and to said vapor storage means, and valve means adjacent aid upper end and connected to said second conduit means for barring the passage of liquid from said upper end of said bag and causing said second conduit means to conduct only fuel vapor from the container means to the vapor storage means.

12. A retrofit kit for application to an automobile having a chassis supporting an engine having a crankcase and carankcase-emission conduit leading via a PCV valve to an intake manifold of said engine, a fuel tank having a tank filler neck vented to the atmosphere, a luggage compartment positioned at a level generally higher than said fuel tank, said kit controlling fuel evaporation and overflow expansion from said tank filler neck and comprising:

means adapted for removably sealing said tank filler neck and for providing a vapor outlet and gasoline overflow port near the upper end of said neck, a first flexible conduit secured to said port and leading upwardly therefrom, a flexible and substantially fully collapisible bag including means adapted for mounting said bag in a said luggage compartment at a height above said port, the lower end of said bag being connected to said first conduit so that, when installed, vapor from said tank and liquid gasoline overflow therefrom due to gasoline expansion can flow up into said bag and so that liquid gasoline can later flow back down from said bag into said tank without requiring any vent from the tank, vapor passage valve means at the upper end of said bag, including means for passing vapor to and from said bag and for barring the passage of liquid from said bag, a second flexibe conduit leading from said vapor passage valve means, a vapor storage cannister containing a fuel vapor absorbent and connected to said conduit for receiving and storing vapors from said bag, means adapted for securing said cannister to a said chassis, and purge line conduit means adapted for connecting said cannister to said intake manifold.

13. The device of claim 12 having a tee fitting adapted for securement to a said crankcase-emission conduit between said engine crankcase and said intake manifold, said purge line conduit means being connected to said tee fitting.

* * * * *

UNITED STATES PATENT AND TRADEMARK OFFICE
CERTIFICATE OF CORRECTION

PATENT NO. : 4,000,727
DATED : January 4, 1977
INVENTOR(S) : Brooks Walker

It is certified that error appears in the above-identified patent and that said Letters Patent are hereby corrected as shown below:

Column 1, line 16, "evapoation" should read --evaporation--.

Column 9, line 46, "addapted" should read --adapted--.

Column 10, line 8, "aid upper end" should read
--said upper end--.

Column 10, line 16, "carankcase-emission" should read
--crankcase-emission--.

Column 10, line 28, "collapisible" should read --collapsible--.

Column 10, line 45, "said conduit" should read
--said second conduit--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*